No. 873,183. PATENTED DEC. 10, 1907.
O. V. STAPP.
PLATEN GAGE.
APPLICATION FILED FEB. 20, 1907.
2 SHEETS—SHEET 1.
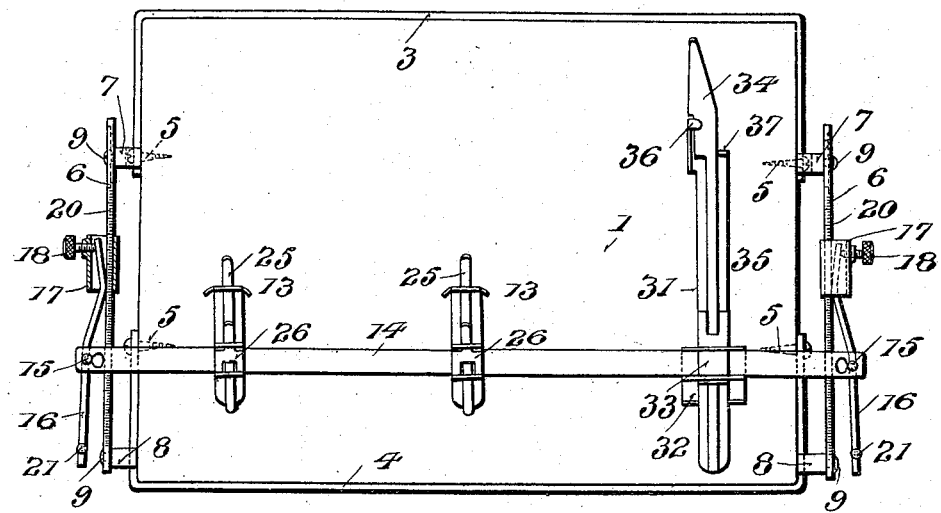
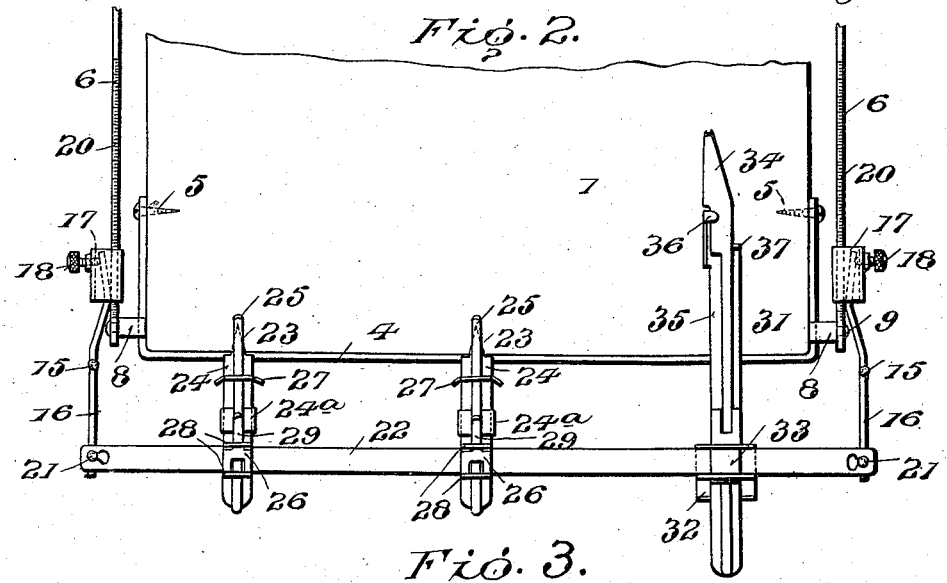
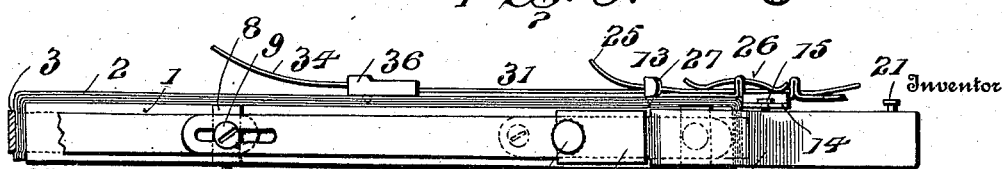

No. 873,183.
PATENTED DEC. 10, 1907.
O. V. STAPP.
PLATEN GAGE.
APPLICATION FILED FEB. 20, 1907.
2 SHEETS—SHEET 2.
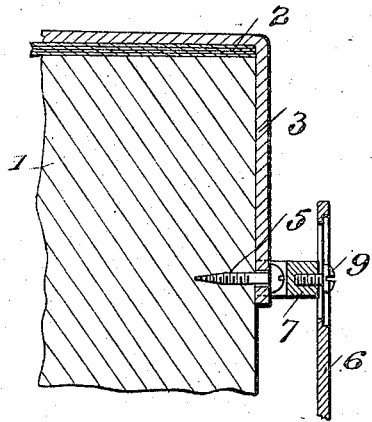
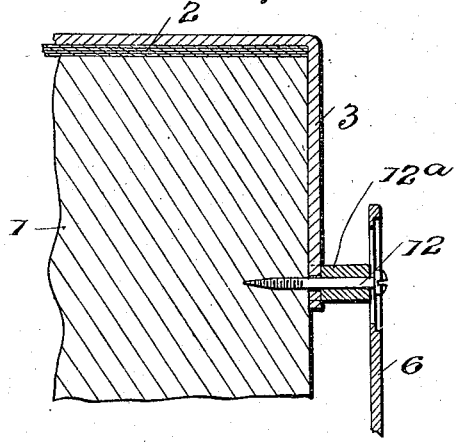
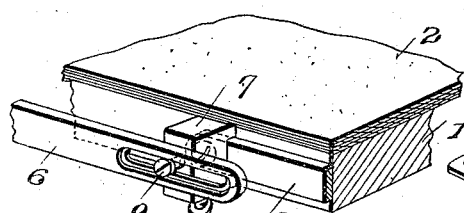
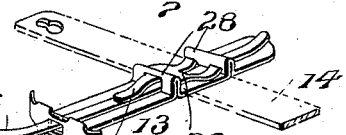
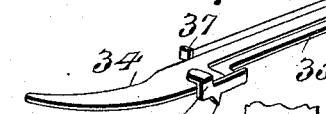
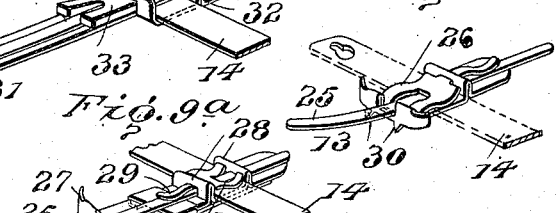
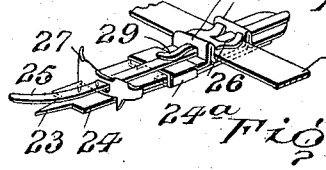
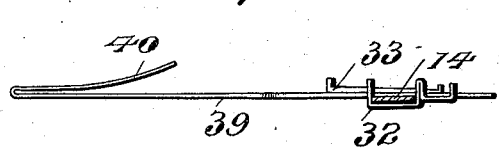
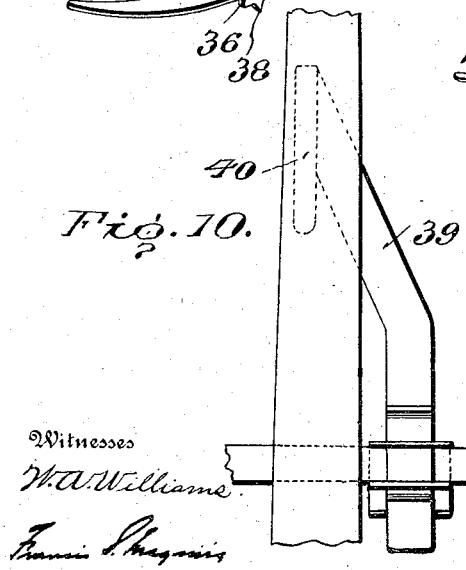
Witnesses
W. A. Williams
Inventor
Orrill V. Stapp
Attorney

UNITED STATES PATENT OFFICE.

ORRILL V. STAPP, OF SEATTLE, WASHINGTON.

PLATEN-GAGE.

No. 873,183.      Specification of Letters Patent.      Patented Dec. 10, 1907.

Application filed February 20, 1907. Serial No. 358,414.

*To all whom it may concern:*

Be it known that I, ORRILL V. STAPP, of Seattle, in the county of King and State of Washington, have invented certain new and useful Improvements in Platen-Gages; and I do hereby declare the following to be a full, clear, and exact description of the invention, such as will enable others skilled in the art to which it appertains to make and use the same.

The primary object of this invention is to provide adjustable supports for platen gages which may be so secured as to obstruct the face of the platen as little as possible, and at the same time allow of convenient access in perfecting the make ready, and insure the firm bearing of the gages on the platen sheet to prevent paper from slipping thereunder.

A further object is to provide a gage which may be readily adjusted to suit different conditions.

The invention will be hereinafter fully set forth and particularly pointed out in the claims.

In the accompanying drawings, Figure 1 is a face view. Fig. 2 is a similar view showing the gage-bar beneath the platen, with slightly modified form of gage. Fig. 3 is an edge view. Fig. 4 is an enlarged sectional view of portions of the platen, one of the tympan bails, and side-bar. Fig. 5 is a similar view showing a slight modification. Fig. 6 is a fragmentary view in perspective showing the connection of one of the side bars to a tympan bail. Fig. 7 is a view in perspective of one of the gages. Fig. 8 is a similar view of the side gage. Fig. 9 shows in perspective a slightly modified form of gage. Fig. 9ª is a similar view of the gage shown in Fig. 2. Fig. 10 is a face view of a modified form of side gage, an edge view of which is shown in Fig. 11.

Referring to the drawings, 1 designates the platen; 2 the sheet or blanket therefor; and 3 and 4 the tympan bails for securing the blanket. Each tympan bail member is of elongated U-shape, and is pivoted by screws or trunnions 5 to the side edges of the platen, the connecting portions of the sides of such members being extended along the upper and lower longitudinal edges to bind and retain the blanket.

6, 6, designate two guide bars off-set from and parallel with the sides of the platen. They are held to blocks 7 and 8 by screws 9, said blocks being adjustably secured to the respective tympan bails by screws 10. At their upper ends guide-bars 6 are formed with slots through which are passed the respective screws 9 working in blocks 7. By the described construction the upper tympan bail member 3 may be turned axially on its trunnions without changing the position of either of the side bars 6, the blocks 7 being located in line with the pivots of said tympan bail member, and when the lower tympan bail member 4 is turned on its pivots, the side bars 6 turn on their upper retaining screws 9.

If desired single screws 12 may form the pivots for the tympan bail member 3 and also retain the side-bars 6, a washer 12ª being interposed. (See Fig. 5.)

The gages 13 are adjustably mounted on a support in the form of a bar 14 of thin metal extended over the platen-blanket, and at its ends formed with openings to accommodate lugs 15 projecting from the upper edges of tension levers 16, the short arms of which latter extend into sliding keepers 17 movable longitudinally of side bars 6. Each of these levers 16 is shown as consisting of a bar bent near its upper end so as to have a fulcrum-contact with the outer face of its respective side bar 6, its short arm being engaged by a binding screw 18, the pressure of which will cause the outer longer arm to move laterally away from its respective side bar. Thus tension is placed upon the gage support, and the keepers are locked to the side bars. The upper edges of the latter are graduated, as at 20, so as to secure uniformity in the adjustment of the two keepers, which latter are free to be moved when the binding screws are released. When the screws 18 are released the gage support may be adjusted up or down on the platen, or may be removed to be repositioned in engagement with a second set of lugs 21 extending from the upper edges of the levers. These latter lugs, however, are primarily designed for a second support, 22, carrying extension gages 23, which are employed when the form is equal to the full depth of the platen. In this way a margin may be left on the stock being printed.

As shown in Fig. 2, the gage support occupies a position beneath the platen, and the gages 23 carry under plates 24 pointed at their upper ends so as to enter the blanket at the bottom fold thereof, thus insuring the proper positioning of the stock against the stop flanges of the gages. The pointed plates are held to the base-plates of the gages by guide loops or keepers 24ª, and the gages are retained on their support by the frictional engagement of the depressible extensible spring tongues 25 and binding members 26, said tongues being passed through coincident openings in the stop flanges 27 and the guide flanges 28. Between the latter are located the binding members 26 having tongues 29 which are passed through one of the guide flanges 28 and bear against the tongues 25. To adjust the gages the pointed plates 24 are withdrawn from the blanket, whereupon the gages may be moved laterally, that is, longitudinally of their support, which latter fits between the guide flanges 28.

The gages 13, usually employed, differ from the extension gages, in that the pointed plates 24 are omitted. In both forms the spring tongues 25 are capable of being moved in either direction, although securely retained as against slipping by the tension exerted thereon by the binding members 26, such tension also retaining the gages on their support. Each gage 13 is formed with teeth 30 which take into the blanket to prevent paper from getting beneath them. As shown in Fig. 1, the base member of each gage may be elongated some distance beyond its support, or it may terminate at the upper edge thereof, as shown in Fig. 7. While the tension of the binding members 26 is amply sufficient to retain the gages on their support, and to hold the yielding fingers in position, yet they permit the gages to be bodily moved lengthwise of their support, and the fingers to be moved back and forth.

31 designates the side gage which consists of a base member 32 having parallel walls to accommodate the support 14 and wedge 33 inserted through openings in said walls to retain therein a spring finger 34 and its guide 35, which latter is formed at its upper free end with flanges 36 and 37 to guide and limit the movements of the free end of such finger, and a tooth 38 for taking in the blanket. This side gage may be adjusted lengthwise and also moved longitudinally on its support.

In Figs. 10 and 11 I have shown a slightly modified form of side-gage, necessary when the free end of the gage is in line to be engaged by a gripper. The change consists in deflecting the finger 39 laterally and equipping it at its free end with a spring-tongue 40, which permits the gripper to bear thereon without injury or interference.

The advantages of my invention are apparent. It will be seen that the position of the gage support may be readily changed, together with the gages mounted thereon, or another support, with different gages, may be substituted and located at the same point or at a point below the blanket to enable larger forms to be employed; that by adjusting the positions of the keepers 17, the gage support may be shifted up and down on the platen and securely held under sufficient tension to insure the firm engagement of the gages with the blanket. It is also manifest that this adjustable attachment for the gages in no way interferes with the face of the platen, and likewise allows of the ready manipulation of the tympan bails.

I claim as my invention:

1. The combination with a platen, of gages, a bar to which the latter are secured, supports for the bar at the ends thereof, such supports consisting each of a single bar movable lengthwise and also laterally relative to the platen, and holding means engaging each support at the inner or upper end thereof, the outer or lower ends of such supports being free and capable of being extended beyond the lower edge of the platen.

2. The combination with a platen, of gages, a bar to which the latter are secured, supports for the bar at the ends thereof, such supports consisting each of a lever, and devices engaging said levers at one end, said levers being movable at their outer or lower ends away from the side edges of the platen and capable of being extended beyond the lower edge thereof.

3. The combination with a platen having upper and lower tympan bails, of side bars secured at their ends to said tympan bails, gages, a supporting bar therefor extended lengthwise of the platen, levers bearing against said side bars and to which said supporting bar is secured, and means mounted on said side bars engaging said levers for effecting the turning thereof on their fulcra.

4. The combination with a platen having upper and lower tympan bails pivotally secured to the side edges of the platen, side bars pivotally secured relative to each tympan bail, gages, a support therefor, tension devices for said support, and means adjustably connecting said tension devices to said bars.

5. The combination with a platen having upper and lower tympan bails pivotally secured to the side edges of the platen, side bars pivotally secured relative to each tympan bail, gages, a support therefor, levers mounted on said side bars, and to which said gage-support is secured, keepers on said side bars into which one of the arms of each lever projects, and means engaging said levers for holding them and the keepers on said side bars.

6. The combination with a platen, and upper and lower tympan bails pivotally secured to the side edges of the platen, of side bars, means securing such side bars to said tympan bails, both side bars being secured to one of the tympan bails in line with the pivots therefor, gages, a support therefor, and means adjustably securing said support to said side-bars.

7. The combination with a platen, of a series of gages designed to be located at or beneath the lower edge of the platen and having each a flat plate pointed at its inner or upper end for entering the platen-blanket at the bottom fold thereof, and also having a stop flange near the point of such plate, a support for the gages located beneath the platen, and means holding said support to the platen.

8. The combination with a platen, of a series of gages designed to be located at or beneath the lower edge of the platen and having each a flat plate pointed at its inner or upper end for entering the platen-blanket at the bottom fold thereof, a second plate having a stop flange near the point of said plate, said plates being relatively adjustable, a supporting bar upon which said gages are adjustably mounted, and means for adjustably connecting said supporting bar to the platen.

9. The herein-described gage, comprising a base having parallel walls, a binding member located between said walls and having a spring tongue extending through one of said walls, and a flexible finger extended beneath said tongue and projecting beyond the end of the gage.

10. The herein-described gage, comprising a base having parallel walls formed with openings, a binding member located between said walls and having a spring tongue extending through one of said walls, and a flexible finger extended beneath said tongue and through both walls and projecting beyond the end of the gage, said base member having teeth projecting from its underside.

11. The combination with the gage-supporting bar, and the gages, of the side gage mounted on said bar and capable of being adjusted longitudinally thereof and itself extensible longitudinally, said side gage having a depressible spring tongue, a base having parallel walls to accommodate said supporting bar, and a wedge inserted through openings in said walls to retain said side gage in place on said bar.

In testimony whereof, I have signed this specification in the presence of two subscribing witnesses.

ORRILL V. STAPP.

Witnesses:
HUGH A. GARLAND,
ALBERT M. HUMPHREY.